Figure 1:
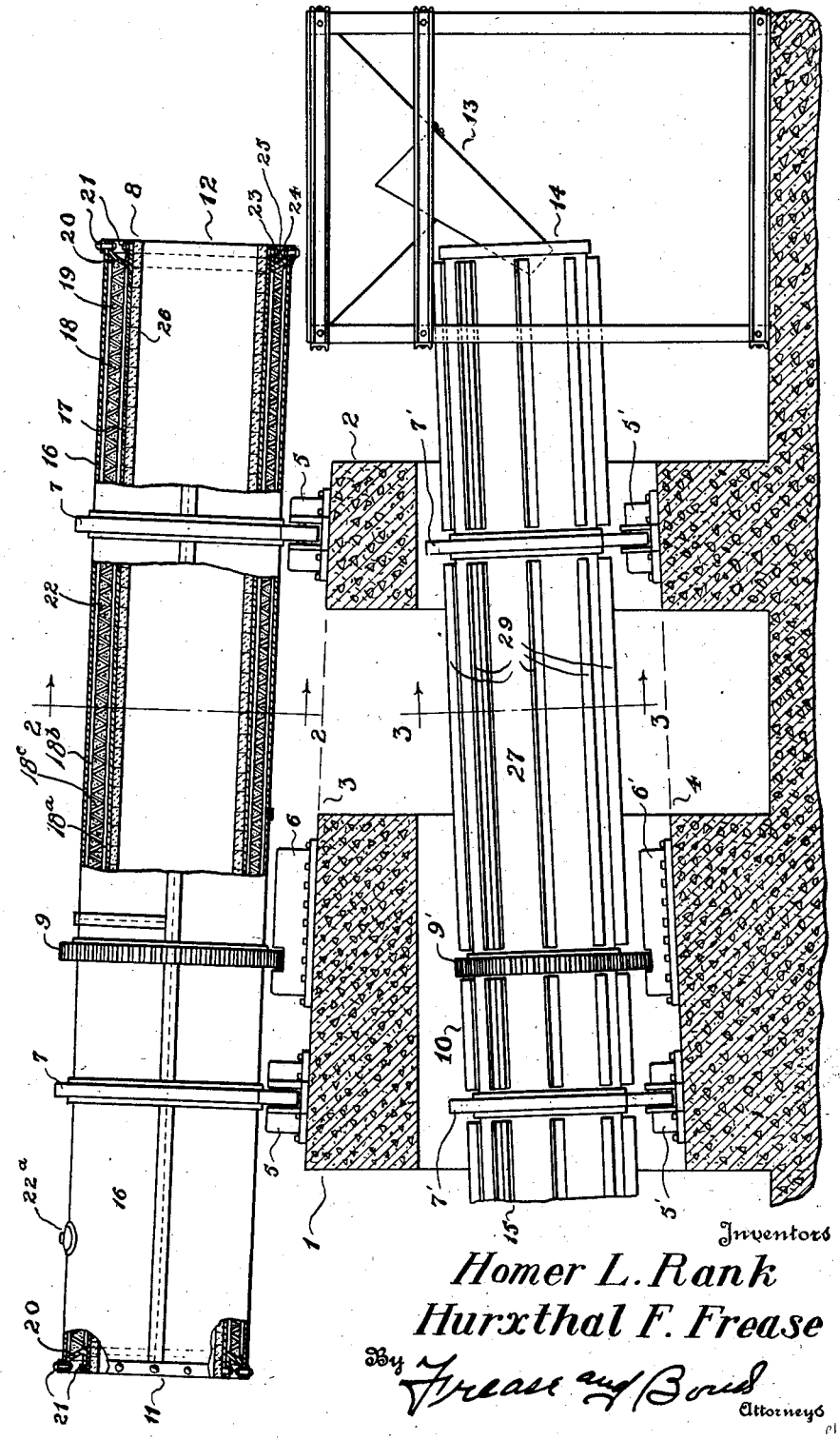

March 30, 1926. 1,579,030
H. L. RANK ET AL
TUBULAR PROCESSING APPARATUS
Filed Dec. 31, 1924   5 Sheets-Sheet 1

Inventors
Homer L. Rank
Hurxthal F. Frease
By Frease and Bond
Attorneys

March 30, 1926.                                                    1,579,030
H. L. RANK ET AL
TUBULAR PROCESSING APPARATUS
Filed Dec. 31, 1924        5 Sheets-Sheet 2

Inventors
Homer L. Rank
Hurxthal F. Frease
By Frease and Bond
Attorneys

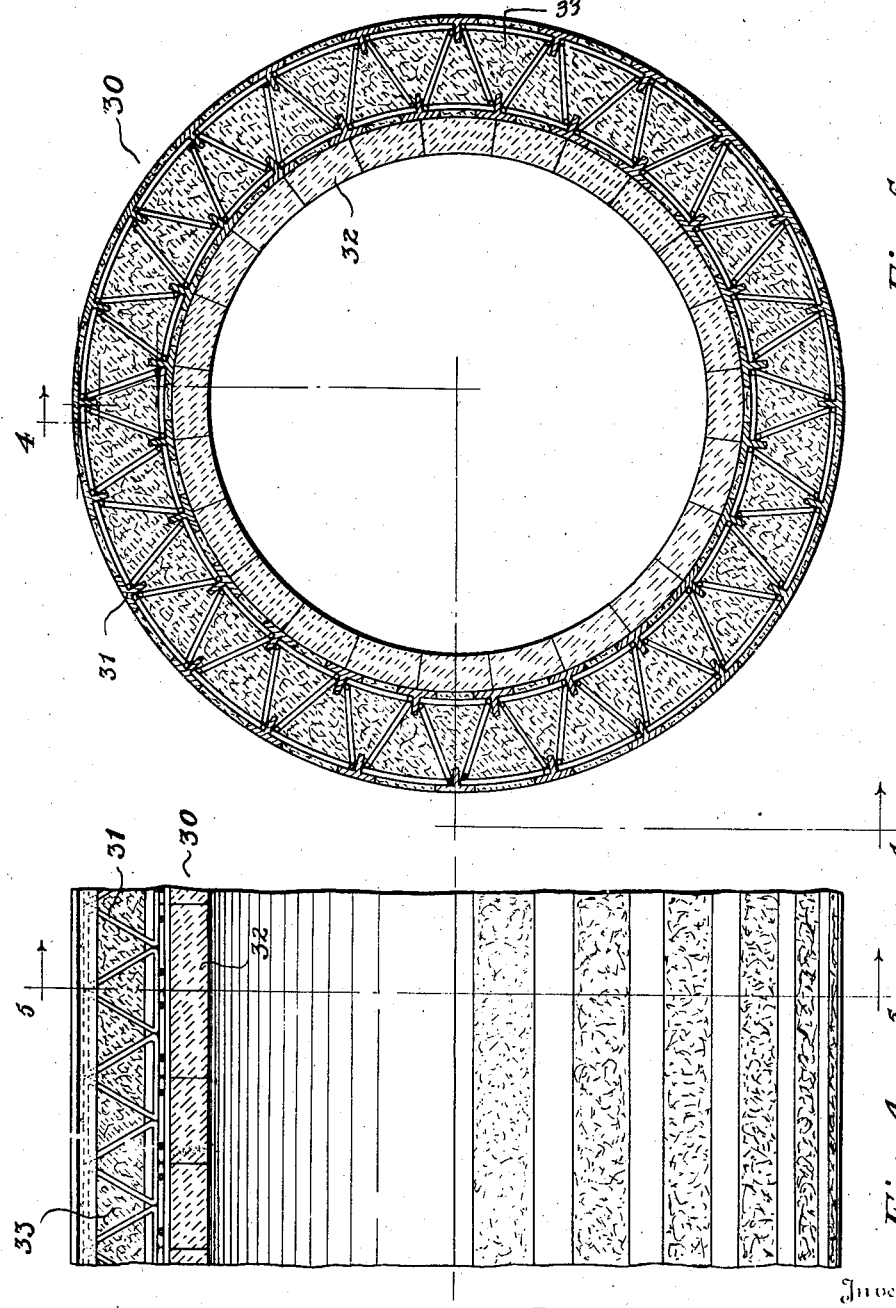

March 30, 1926.

H. L. RANK ET AL 1,579,030

TUBULAR PROCESSING APPARATUS

Filed Dec. 31, 1924   5 Sheets-Sheet 5

Inventors
Homer L. Rank
Hurxthal F. Frease
By Frease and Bru Attorneys

Patented Mar. 30, 1926.

1,579,030

UNITED STATES PATENT OFFICE.

HOMER L. RANK AND HURXTHAL F. FREASE, OF CANTON, OHIO.

TUBULAR PROCESSING APPARATUS.

Application filed December 31, 1924. Serial No. 759,216.

*To all whom it may concern:*

Be it known that we, HOMER L. RANK and HURXTHAL F. FREASE, citizens of the United States, residing at Canton, in the county of Stark and State of Ohio, have invented new and useful Improvements in Tubular Processing Apparatus, of which the following is a specification.

The invention relates to apparatus such as rotary kilns, coolers, dryers, and the like for use in chemical, mineral, metallurgical, material handling and treating processes such as the manufacture of cement; the decomposition of alunite or alum stone for the production of potassium sulphate; the recovery of potash from distillery waste and from kelp; the disposal of pineapple waste at the pineapple canneries; the furnacing of feldspar, green sand, and wyomingite; the recovery of soda from waste liquors in both the soda and soda-sulphate processes of pulp manufacture; the manufacture of blanc fixe; the manufacture of lithopane; the production of strontia; the manufacture of sodium bichromate; the nodulizing of copper concentrates and iron ores; the reclaiming of fuller's earth; the burning of lime and magnesite; the carbonization of wood, saw dust, peat, lignite, and coal; the carbonization of organic matter; and the like.

Such processes are characterized among other things by subjecting the material under treatment to one or more of the steps of heating, cooling, and drying, either independently or in various combinations of sequences.

Apparatus commonly used for such processing includes some form of horizontal rotary tube through which the material is fed and subjected to the desired treatment.

For securing a large flow of material through the tube, a comparatively large diameter of tube is desirable, and for securing and controlling any desired temperature gradient along the tube, a comparatively long tube is likewise desirable. On the other hand the tubes are preferably supported only on two riding rings. It has been found difficult to attain all these desirable features in tubes of comparatively large dimensions without encountering excessive manufacturing, operating, and maintenance costs, due chiefly to the excessive weight of material required under present methods of construction, and to the effects of thermally induced expansion and contraction.

It has also been found difficult to attain a high degree of thermal efficiency in operating rotary tubular processing apparatus, due among other things to radiation losses in the case of kilns and dryers, and to comparatively small radiating surfaces in the case of coolers.

The objects of the present invention are to provide structural means which enable the economical production, operation, and maintenance of tubular processing apparatus having comparatively large dimensions and comparatively light weight, and which may be capable of operation under conditions of comparatively high thermal efficiency.

A further object of the invention is to provide a tubular processing apparatus of the character described which shall be inherently safeguarded against the dangers of thermally induced expansion and contraction of its parts.

These objects are attained by the use in various combinations of tubular frame structures, preferably trussed, including members determining an inner tubular surface, members determining an outer tubular surface and connecting members therefor, tubular shells, heat insulating materials, vacuum chambers, and radiating fins, hereafter to be described in greater detail.

Several forms of the invention are illustrated in the accompanying drawings forming part hereof, in which—

Figure 2:
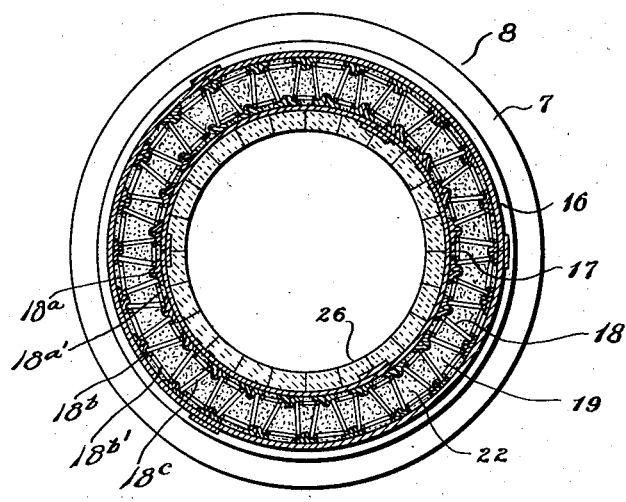
Figure 3:
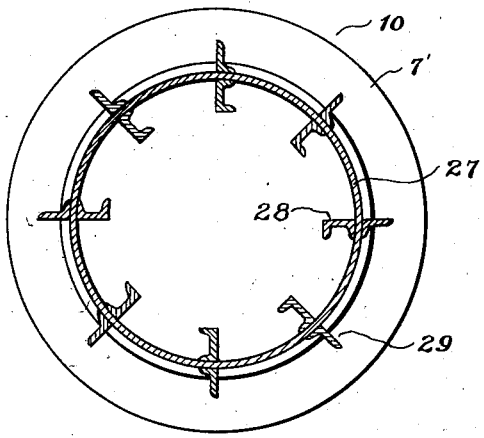
Figure 6:
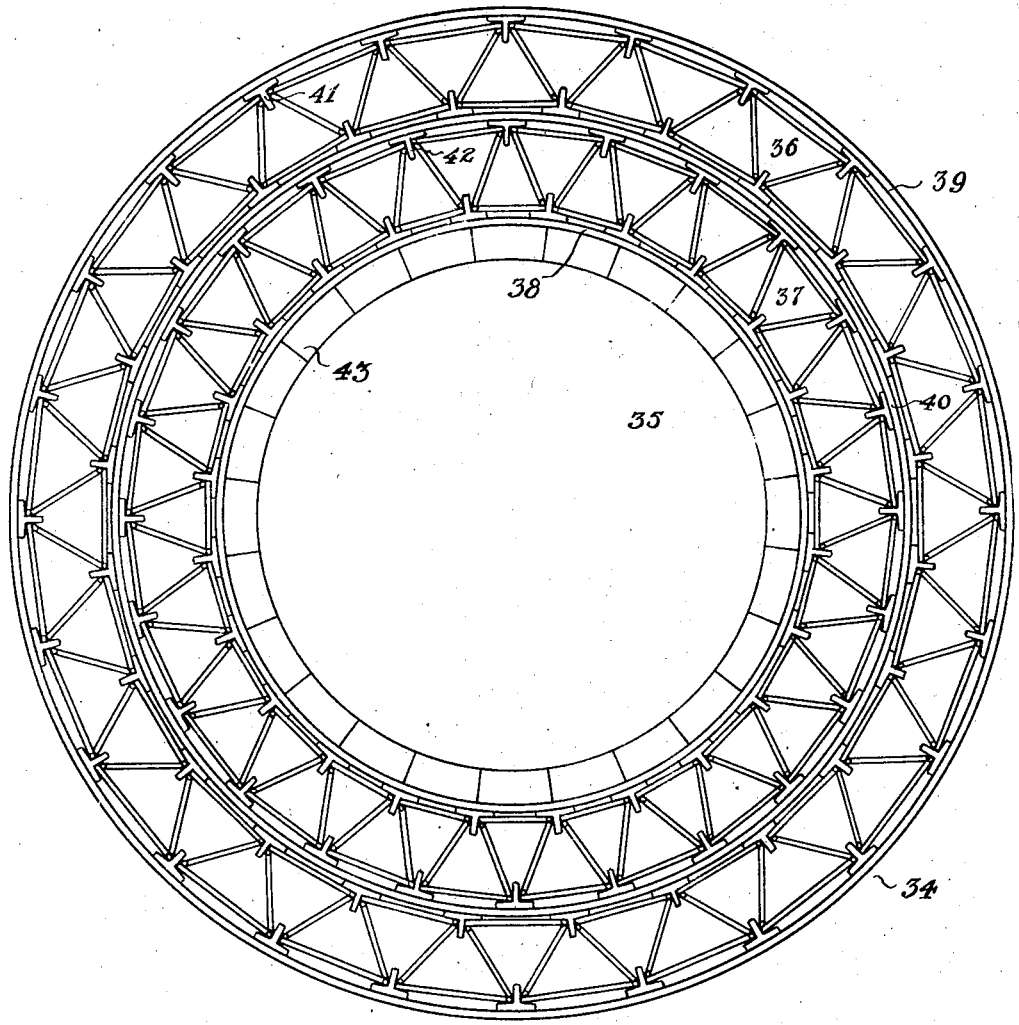
Figure 7:
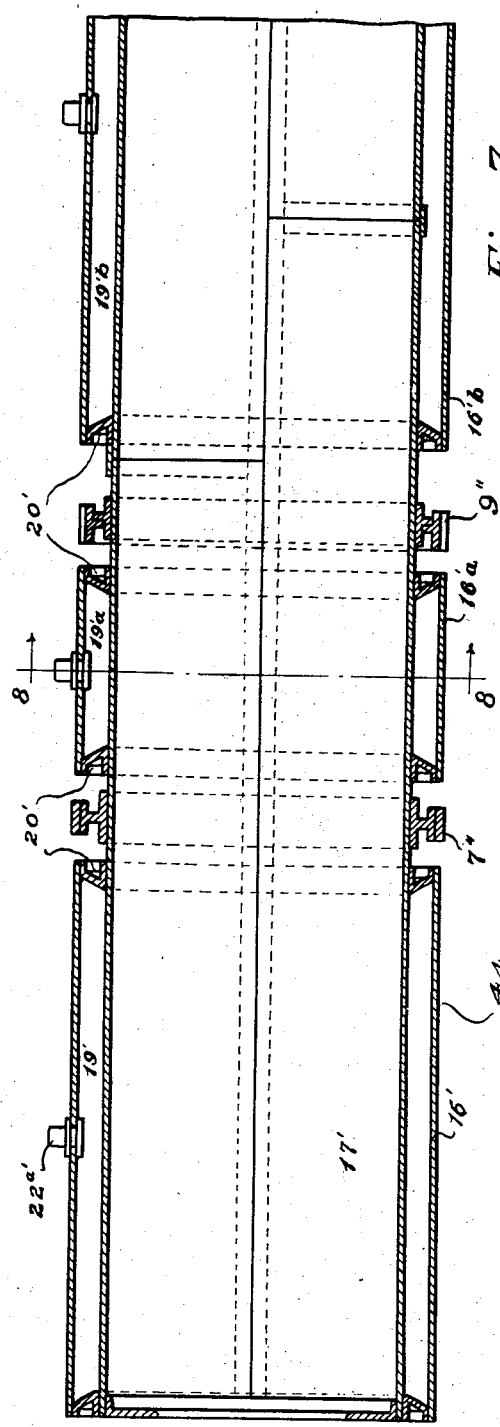
Figure 8:
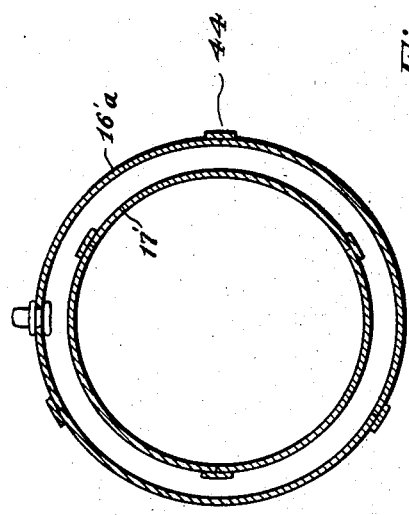

Figure 1 is a side elevation with a portion in longitudinal cross-section, of one form of the apparatus set up as for the manufacture of cement; and including, for heating the material, a rotary kiln having inner and outer tubular shells spaced and maintained by truss means, the chamber between the shells being preferably filled with a heat insulating material such as diatomaceous earth, and substantially evacuated to provide in effect a vacuum chamber about the interior of the kiln; and, for cooling the calcined cement, a rotary tubular cooler having external longitudinal radiating fins secured to its shell;

Fig. 2, a transverse cross-section of the kiln removed from its setting, as on line 2—2, Fig. 1;

Fig. 3, a transverse cross-section of the cooler, removed from its setting, as on line 3—3, Fig. 1;

Fig. 4, a fragmentary longitudinal elevation and cross-section, as on line 4—4, Fig. 5, of another form of apparatus including a tubular trussed structure sustaining a lining of refractory material such as fire brick;

Fig. 5, a transverse cross-section of the same, as on line 5—5, Fig. 4;

Fig. 6, an end elevation, with end closures removed, of another form of apparatus adapted for indirect heating of the material to be processed and including a plurality of spaced and trussed tubular shells forming an external annular chamber which may be evacuated, an internal tubular combustion chamber which may be lined with a material such as fire clay, and an intermediate chamber in which material may be processed;

Fig. 7, a longitudinal cross-section of another form of apparatus, in which annular heat insulating chambers which may or may not be trussed have been formed about an inner tube carrying riding rings and a driving gear;

Fig. 8, a transverse cross-section of the same as on line 8—8, Fig. 7.

Throughout the drawings, where means such as rivets are not specifically illustrated for securing apparatus parts together it is to be understood that the parts are secured to each other when necessary and desirable by some form of welds, such as arc welds not readily adapted to convenient illustration; although rivets or other fastening means, not shown, may be substituted for the welds, when desired.

Likewise, the truss formations, which constitute parts of the apparatus may be made according to any well known manner; but it is preferred to use some form of trussed structures, which are described in the pending application for United States patent of George Hives Dawson and Hurxthal Field Frease, Serial No. 676,897, filed November 26, 1923, and in subsequent joint and several applications of the aforesaid.

Similar numerals refer to similar parts throughout the drawings.

The embodiment of the present invention illustrated in Figs. 1, 2 and 3, includes supporting arches 1 and 2. On each of two elevations, reversely inclined to the horizontal and indicated at 3 and 4, the arches maintain two carrying and thrust mechanisms indicated at 5 and 5' of any usual design, and an enclosed driving mechanism indicated at 6 and 6', likewise of any usual design.

At the upper level 3 carrying and thrust mechanisms 5 support in the usual manner the rotatable riding rings 7, of the rotary tubular kiln 8, and the driving mechanism 6 is in the usual operative connection with the rotatable gear ring 9 of the kiln.

Similarly, at the lower level 4, the carrying and thrust mechanism 5' support the rotatable riding rings 7' of the rotary tubular cooler 10; and the driving mechanism 6' is in operative connection with the rotatable gear ring 9' of the cooler.

In accordance with usual practice, by the above arrangement the inlet 11 of the kiln is at a higher level than its outlet 12, and a hopper 13 is provided for communication from the outlet of the kiln to the inlet 14 of the cooler, likewise elevated above its outlet end 15.

It is understood that the operation, as in the manufacture of cement, of the processing unit of Figs. 1, 2 and 3, including the rotary kiln 8, in communication by means of hopper 13 with the rotary cooler 10, is similar to the operation of any usual cement making apparatus including a rotary kiln and a rotay cooler.

In accordance with the usual practice the ingredients of the cement may be delivered into the kiln inlet by any convenient means, and there subjected to the action of intense heat, as from a direct oil flame not shown.

The ingredients are thus caused to combine to make cement which issues from the outlet of the kiln as a glowing powdery mass, and is delivered by the hopper into the cooler where the high temperature of the glowing cement is reduced to a degree permitting packing and storage.

In other words the function of the kiln is to heat ingredients as rapidly and under as much control as possible, and the function of the cooler is to bring down the temperature of the product of the kiln as rapidly as possible to the desired degree for handling.

In the usual form, both kiln and cooler consist primarily of plates forming single wall tubular shells carrying riding rings and a gear ring, the riding rings being mounted on carrying mechanisms and the gear ring being in operative connection with a driving mechanism substantially as described for the apparatus of the present invention.

Structurally, such single wall shells mounted each on a pair of riding rings are difficult to build in comparatively great lengths and diameters, without the use of excessively heavy plates.

On the other hand, for processing large quantities of material quickly, kiln and cooler tubes of comparatively great length and diameter are desirable.

From the heat standpoint, in the usual single wall kiln, which is essentially a heater, while the latter is usually lined with fire brick, radiation losses are excessive because of the direct exposure of the outer surface of the kiln to the atmosphere. Attempts have been made to provide single wall kilns with masonry enclosures, or to cover the surfaces of the kilns with such material as asbestos, but universally satisfactory results have not been attained.

On the other hand, in the usual cooler, which is essentially a radiator, the smooth cylindrical external surface is not conducive to high radiating efficiency.

In other words, neither the kiln nor the cooler as usually made have high thermal efficiencies. Consequently their co-operative action on the ingredients being processed makes the whole unit doubly inefficient.

The structural characteristics of the kiln and cooler tubes of the present invention, presently to be described, enable at one and the same time, the use of light weight tubes having comparatively great length and diameter, and which have high thermal efficiencies, due provision being made for the effects of expansion and contraction.

The kiln 8 includes an outer tubular shell 16, and an inner tubular shell 17, made in the usual manner from a plurality of formed plates joined to each other at their edges.

A tubular frame structure, preferably a circumferentially and longitudinally trussed tubular structure, indicated at 18, and including members 18$^a$ and 18$^{a\prime}$, determining an inner tubular surface, members 18$^b$ and 18$^{b\prime}$, determining an outer tubular surface, and members 18$^c$, connecting the inner and outer surface members, spaces and maintains the shells 16 and 17, an annular chamber 19 thus being formed between them.

The ends of this chamber are closed by expansion rings 20 secured to the ends of the shells as by rivets 27. All the joints of the shell plates and shells and rings are preferably caulked to make the chamber 19 substantially air tight.

The chamber 19 may be filled with a heat insulating material 22, such as diatomaceous earth, and a suction valve 22$^a$ may be provided for connection with a suction pump for the purpose of substantially evacuating the voids in the chamber 19 when the apparatus is first constructed; and for subsequent connection with a suction pump from time to time as may be required to maintain the desired vacuum.

While any desired tubular frame structural means may be used to space and maintain the inner and outer shells, the circumferential and longitudinal truss means illustrated are forms of the joint and several trussed structures, inventions of George Hives Dawson and Hurxthal Field Frease, and which are the subject matter of co-pending and companion applications for Letters Patent of the United States.

For providing for differential dimensional variations of the inner and outer shells 16 and 17, the truss spacing means 18 are preferably not connected to either of the shells, and are thus slidable between them.

The expansion rings 20, are preferably made of pressed metal and include inner ring flanges 23, and outer ring flanges 24, connected by a conical segment 25 outwardly diverging as shown so that the differential increase of the length of the inner shell over the length of the outer shell caused by the action of the heat in the kiln will have a tendency to relieve the pressure of the outer shell on the truss means 18, rather than increase it.

A refractory lining 26 may be provided as is the usual custom, for protecting the inner surface of the inner shell from the direct action of heat. The cooler 10 includes a tubular shell 27, having a plurality of internally mounted longitudinal lifter bars 28, in the usual manner. A plurality of external longitudinal radiating fins 29, are provided for increasing the radiating efficiency of the cooler.

By the use of the evacuated chamber surrounding the kiln, the efficiency of the kiln as a heater is increased. By the use of the external radiating fins on the cooler, the efficiency of the cooler as a radiator is increased. Consequently the over all efficiency of the unit is doubly increased.

For use for instance in the metallurgical treatment of ores, a modified form of tubular processing apparatus may be desirable, of which the essential tubular structure 30 is illustrated in Figs. 4 and 5.

The structure 30 includes a circumferential and longitudinal trussed structure 31, carrying an inner tubular lining 32 of refractory material such as fire brick. The truss members may be further protected by an embedding coating of such material as asbestos, indicated at 33.

Another modified form of tubular structure 34 is illustrated in Fig. 6, and includes an inner firing chamber 35, an outer annular chamber 36 and an intermediate chamber 37 formed by the tubular shells 38, 39 and 40, spaced and maintained by the truss means 41 and 42. As usual a protective refractory lining 43 is preferably provided for the inner firing chamber 35. The outer annular chamber 36 is preferably evacuated for preventing radiation losses, and material may be economically processed in the intermediate annular chamber 37 by indirect heat transmitted through the inner shell 38. This form of apparatus is adapted for use in such processes requiring indirect heat as drying, distillation of coal, and the like.

The modified structure 44 illustrated in Figs. 7 and 8 includes a plurality of plates joined together and forming inner shell 17$^\prime$ which may be the shell of an existing tubular processing apparatus such as a cement kiln which it is desired to transform into the apparatus of the present invention.

Shell 17' carries riding rings 7" and a gear ring 9" as is the custom, and is furthermore provided with a plurality of expansion rings 20' which space and maintain, with or without the assistance of the truss means heretofore described but not illustrated in Figs. 7 and 8 for convenience, the outer shells 16', 16'a, and 16'b.

The shells and expansion rings thus form annular insulating chambers 19', 19'a, and 19'b, and valves 22a' are preferably provided for connection to a vacuum pump as described for the apparatus illustrated in Figs. 1 to 4.

We claim:

1. A tubular processing apparatus including a tubular trussed structure, and a shell sustained by the structure.

2. A tubular processing apparatus including a tubular trussed structure, and a refractory shell sustained by the structure.

3. A tubular processing apparatus including an outer tubular shell, an inner tubular shell, a chamber between the shells, means closing the ends of the chamber, and a tubular trussed structure in the chamber spacing and maintaining the shells.

4. A tubular processing apparatus including a tubular frame structure and a shell sustained by the structure, the tubular frame structure including longitudinally arranged frame members connected to each other.

5. A tubular processing apparatus including a tubular frame structure and a refractory shell sustained by the structure, the tubular frame structure including longitudinally arranged frame members connected to each other.

6. A tubular processing apparatus including an outer tubular shell, an inner tubular shell, and a tubular frame structure spacing and maintaining the shells.

7. A tubular processing apparatus including an outer tubular shell, an inner tubular shell, and a tubular trussed structure spacing and maintaining the shells.

8. A tubular processing apparatus including a plurality of tubular shells, and a plurality of tubular frame structures spacing and maintaining the shells.

9. A tubular processing apparatus including a plurality of tubular shells, and a plurality of tubular trussed structures spacing and maintaining the shells.

10. A tubular processing apparatus including an inner tubular shell, an outer tubular shell, and frame structural means spacing and maintaining the shells.

11. A tubular structure for a tubular processing apparatus and the like, including frame members determining an outer tubular surface, frame members determining an inner tubular surface, and frame members connecting the sets of surface members, and a shell sustained by the members.

12. A tubular structure for a tubular processing apparatus and the like, including connected frame members determining an outer tubular surface, connected frame members determining an inner tubular surface, and frame members connecting the sets of surface members, and a shell sustained by the members.

13. A tubular structure for a tubular processing apparatus and the like, including truss members determining an outer tubular surface, truss members determining an inner tubular surface, and truss members connecting the sets of surface members, and a shell sustained by the members.

14. A tubular processing apparatus including a tubular frame structure and a shell sustained by the structure, the tubular frame structure including circumferentially arranged frame members connected to each other.

15. A tubular processing apparatus including a tubular frame structure and a shell sustained by the structure, the tubular frame structure including longitudinally and circumferentially arranged frame members connected to each other.

In testimony that we claim the above we have hereunto subscribed our names.

HOMER L. RANK.
HURXTHAL F. FREASE.